T. K. DIXON, J. C. COX AND A. KLEIN.
MECHANICAL ADDING KEY STORE.
APPLICATION FILED JULY 16, 1920.
1,404,280. Patented Jan. 24, 1922.
2 SHEETS—SHEET 1.
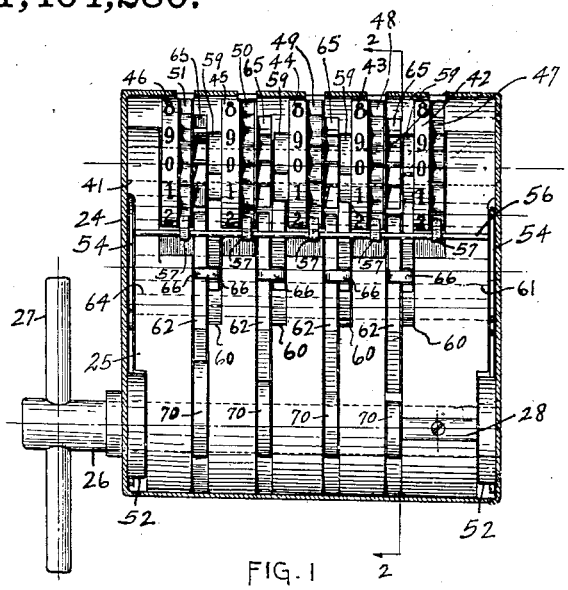
FIG. 1
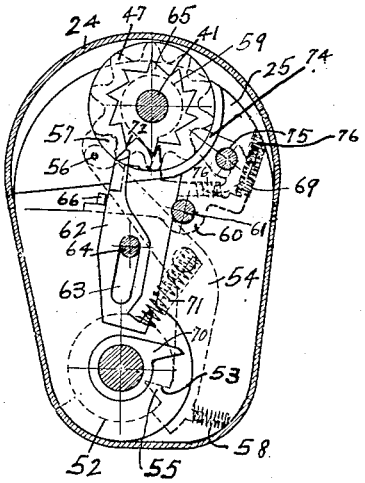
FIG. 2
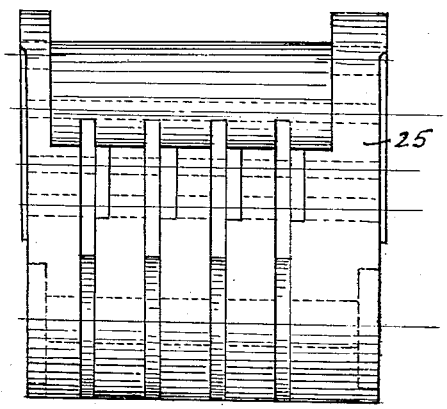
FIG. 3
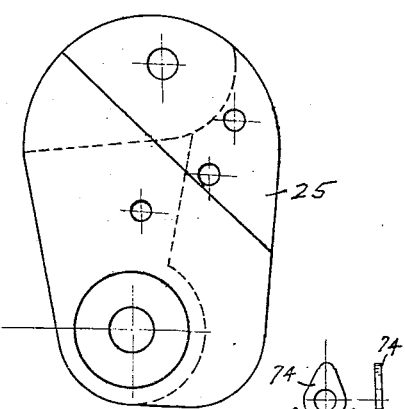
FIG. 4
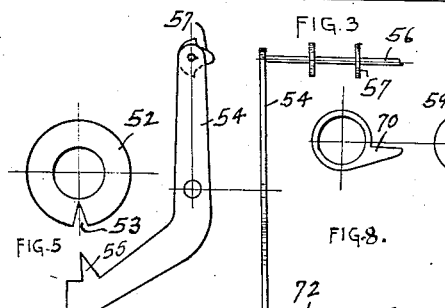
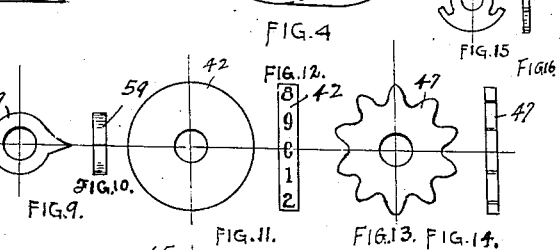
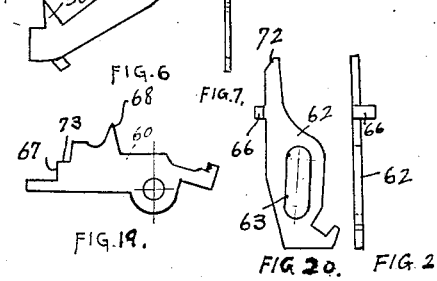
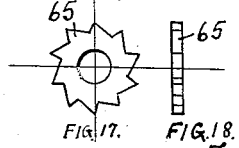
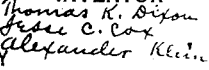
INVENTORS
Thomas K. Dixon
Jesse C. Cox
Alexander Klein
BY
Hardway & Cathy
ATTORNEYS.

T. K. DIXON, J. C. COX AND A. KLEIN.
MECHANICAL ADDING KEY STORE.
APPLICATION FILED JULY 16, 1920.
1,404,280.
Patented Jan. 24, 1922.
2 SHEETS—SHEET 2.
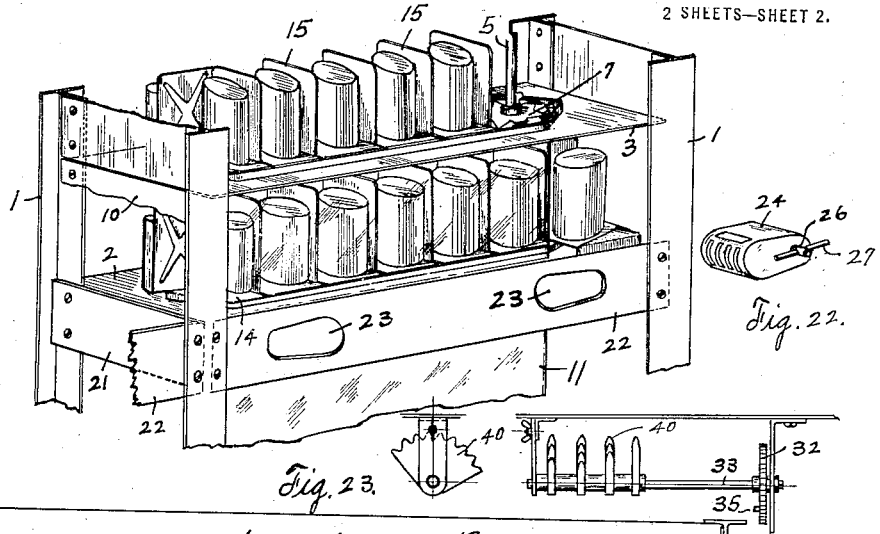
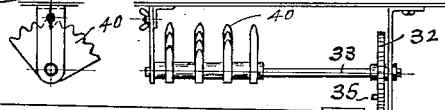
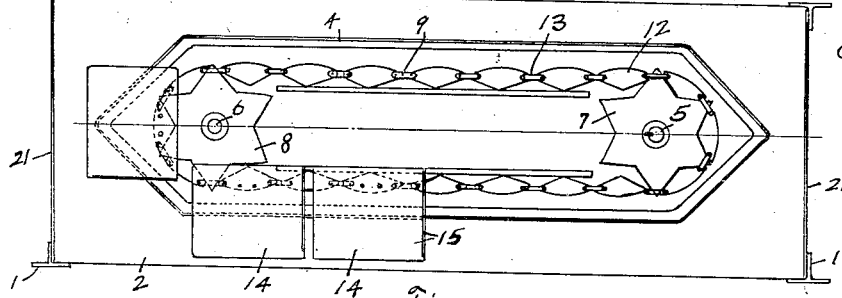
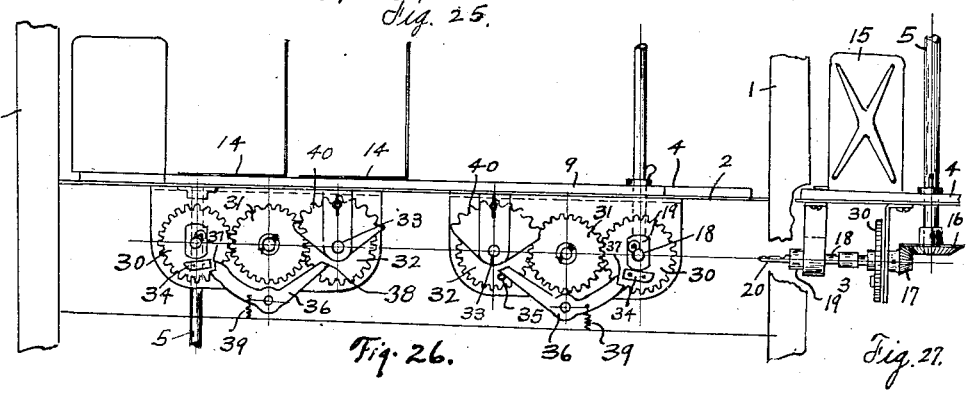
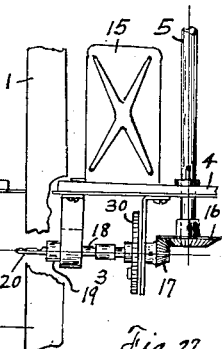
INVENTORS
Thomas K. Dixon
Jesse C. Cox
Alexander Klein
BY
Hardway & Cathey
ATTORNEYS.

UNITED STATES PATENT OFFICE.

THOMAS K. DIXON, JESSE C. COX, AND ALEXANDER KLEIN, OF HOUSTON, TEXAS, ASSIGNORS TO DIXON DEVELOPMENT COMPANY, OF HOUSTON, TEXAS, A CORPORATION OF TEXAS.

MECHANICAL ADDING-KEY STORE.

1,404,280.   Specification of Letters Patent.   Patented Jan. 24, 1922.

Application filed July 16, 1920. Serial No. 396,672.

*To all whom it may concern:*

Be it known that we, THOMAS K. DIXON, JESSE C. COX, and ALEXANDER KLEIN, citizens of the United States, residing at Houston, in the county of Harris and State of Texas, have invented certain new and useful Improvement in a Mechanical Adding-Key Store, of which the following is a specification.

This invention relates to a mechanical adding key store.

One object of the invention is to provide a store in which the mechandise is mechanically controlled, the articles being placed in containers to be moved forward by the turning of a key manually operated by the customer.

Another object is to provide a key constructed to automatically add the amount of each item on the key, which forms a part of this invention.

With the above and other objects in view the invention has certain novel features of construction, operation and arrangement of parts, an example of which is given in the specification and illustrated in the accompanying drawings, wherein:—

Figure 1 is a longitudinal sectional view of the adding key.

Figure 2 is a transverse sectional view.

Figure 3 is a side elevation of the supporting framework.

Figure 4 is an end view.

Figures 5 to 21 inclusive, show detailed views of the operative mechanism.

Figure 22 is a perspective view of the complete adding key illustrated in the preceding figures.

Figure 23 is a fragmentary perspective view of the delivery mechanism.

Figure 24 shows a side view of the gearig employed for operating the adding key mechanism.

Figure 25 shows a pla. view of the delivery mechanism with certain parts removed for the purpose of clearness.

Figure 26 is a fragmentary side view.

Figure 27 is a fragmentary end view.

Figure 28 is a side view of the actuating shaft, illustrating the method employed to connect its sections together.

Figures 29 and 30 show the respective ends of the locking device through which the shafts may be locked against rotation.

Referring now more particularly to the drawings wherein like numerals of reference designate similar parts in each of the figures, 1 designates a suitable supporting framework provided to carry the shelving as designated by 2 and 3, arranged in tiers if desired. Each shelf is provided with a track 4, elliptical in form. At the ends of the track there are vertical shafts 5 and 6 respectively, which extend through the different shelves, and which have bearings therein. These shafts operate the respective sprocket wheels 7 and 8, which are keyed thereon, and when keyed together move a chain 9 on which the separate platforms 14, for the merchandise, are fastened by rivets. The chain 9 is formed of blocks 12 which alternate with connecting links 13, and the teeth of the wheels 7 engage in said links and drive said chain in the usual manner. The driving shaft 5 may be keyed to the wheel 7 of either shelf of the tier, either by hand or the respective wheels 7 may be connected to and disconnected from said shaft automatically. Each shelf forms the bottom of a compartment and the shelf above it forms the top for the lower compartment. The ends of each compartment are made of sheet metal 10, and the fronts of all compartments are glass 11. This forms an inclosure for all merchandise to be displayed and sold from.

The rear sides of all compartments are left open so the stockman can replenish the shelves with the correct stock as needed.

The rotation of the chain 9 moves the merchandise platforms 14 forward to the right. Platforms 14 are of particular design and size to carry the different size of packages of merchandise that is kept in stock.

The forward ends of the platforms are upturned forming guards 15, so the merchandise cannot be removed from the shelves until the price of the article is recorded on the adding key.

When a full turn of the key is made, the package selected by the customer is brought forward to the opening provided for them. The customer can then take his package and pass on to the next article he wishes to purchase. When he leaves a shelf, all other merchandise is inclosed by the ends and fronts 10 and 11 and guards 15, all of which are illustrated in Figure 23.

A bevel gear 16 is pinned to the shaft 5, which is in mesh with bevel gear 17, which is pinned to the inner end of the shaft 18, which is mounted in suitable bearings carried by the framework.

To the outer end of shaft 18, is assembled a lock 19 which is a regular two plunger lock designed to normally lock the rotating mechanism. Projecting outwardly from the lock 19, there is a key 20 provided for a purpose to be hereinafter stated.

The framework has suitable braces 21, and the uprights of the framework are connected by bars 22, arranged between the shelving sections, and provided with suitable openings 23, which are provided for the adding key. The adding key includes an outside case 24 of sheet metal, an adding mechanism frame 25 of aluminum casting designed to hold all parts which make up the adding key.

Extending lengthwise through the case 24 and the casting 25, there is an actuating shaft 26, one end of which carries the operating handle 27. The other end of the shaft 26 forms the center of a two-plunger lock 28, designed in the casting 25. When this lock is assembled, it locks the operating handle so it cannot be turned unless brought together with the key in lock 19. These locks are identically the same and neither lock will allow its shaft to work until unlocked.

Pinned to the shaft 18, is a spur gear 30, which is in mesh with another gear of the same size, 31, and this gear is meshed with another gear 32 of the same size, which is pinned to one end of a shaft 33. This forms a complete rotating mechanism for the shelving and the adding key.

A stop lever 36 is swung on a stud riveted in the same framework as the gear 31. This stop lever is designed to stop the gearing when a complete revolution has been made. This is accomplished in the following manner:—one end 38 of the stop lever is beveled, the other end 37 is formed with a notch.

There is a stud 35 riveted in gear 32, and a block 34 is riveted to gear 30. When the gears are rotating, the stud 35 passes over the beveled end of the lever which raises the lower end of the lever up and causes the notch to engage with the block 34. This causes a complete stop of all the rotating mechanism. To release this lever, the notched end is pulled from contact with the block by means of a small spring 39. This allows all mechanism to be in natural position. Mounted on the shaft 33, there are one or more adding segments 40 which will now be described. These segments have gear teeth in number from 1 to 9, inclusive, the number of segments and teeth on each segment depending on the price of the merchandise offered for sale in a compartment.

If a 13 cent article is to be sold, the segments in this compartment would be two, a 1-tooth segment and a 3-tooth segment, which would add 13 cents for each article taken from this compartment. These segments are made interchangeable so they may be changed as prices change.

As illustrated in the drawings, there are five adding wheels in the adding key, 42, 43, 44, 45 and 46, which have numbers from 0 to 9, inclusive, engraved on them. These adding wheels have gears assembled to them, 47, 48, 49, 50 and 51.

The segments 40 mesh into the driving gears 47, 48, 49, 50 and 51, and carry them forward to correspond with the number of teeth on the segments 40, to produce the correct amount on the adding wheels for which the article of merchandise is to be sold, when the adding key handle 27 was turned.

In case the merchandise, in any particular section, is of less value than 10 cents, only one adding segment is necessary to be mounted on the shaft 33. This segment would be adjusted in the correct position to mesh in the gear of the adding wheel 42, and will have one tooth located on it for each one-cent value, up to 9 cents. If the merchandise should sell for more than 10 cents, there would be two segments mounted on shaft 33, and the teeth on each segment would be properly arranged to take care of the price of the merchandise as the value required from 1 cent to 99 cents, and so on until the price of a single article could be $99.99 which would be registered by four segments as shown.

Two segments would mesh with gears 47 and 48. Three segments would mesh with gears 47, 48 and 49, adding any amount from 1 cent to $9.99; and four segments would add on gears 47, 48, 49 and 50, and would add any amount on the adding key from one cent to $99.99.

The drawings show there are five adding wheels. The last or fifth wheel 46 is known as a transfer wheel, and is not driven by a segment. It is used to take care of the higher amounts as the other wheels fill up, and in many cases, is not used very much but it must be there for safety. It makes it possible to show a capacity on each adding key of any amount from one cent to $999.99.

The adding segments are interchangeable as mentioned before, and can be changed to suit the price of any article from one cent to $99.99.

Pinned to each end of shaft 26, within the end walls of the casing 24, there is a cam 52 provided with a recess 53, as shown.

A part of each end of the casting 25 is milled out to accommodate the cams 52. When the handle 27 is turned, these cams 52 revolve and operate locking pawl levers 54. These levers are swung to the casting 25 by means of a shaft projecting through the casting at the proper position, which forms their bearings. Each lever 54 has a tooth near the lower end which operates in and out of recesses 53 in cams 52.

A connecting rod 56, at the upper ends of these levers, has a set of locking pawls 57 pinned thereon, for the purpose of locking the adding wheels when the adding key is not in use. Locking the pawls into the adding wheel gears is accomplished by means of a compression spring 58, at the lower end of each lever 54, which force the teeth 55 into the recesses 53 of the cams 52. These pawls are released from the adding wheel gears when the operating handle 27 is started, because teeth 55 ride on the outside of cams 52, which allows the adding wheels 42, 43, 44 and 45 to be rotated by segments 40.

Attached to the adding wheels 42, 43, 44 and 45, are cams known as trip cams 59. These cams operate trip pawls 60. These pawls are swung on a rod 61, which extends through the casting 25, located in a position to come in direct contact with the trip cams 59. These trip pawls are provided to co-operate with the transfer levers 62. The transfer levers are designed with oblong slots 63 forming sliding bearings on a rod 64, which extends through the casting 25. These transfer levers are designed to operate the adding wheel ratchets 65.

Each transfer lever is designed with a lug 66, which normally lies upon the table 67 of the trip pawl 60. With each complete rotation of any adding wheel the corresponding trip cam 59 of same wheel contacts against the projection 68 of the trip pawl, and forces it back, allowing the lug 66 of the transfer lever to drop down off the table where it normally lies. Each trip pawl 60 is always held in tension by spring 69, which serves to force the trip pawl toward the trip cam at all times. When the transfer lever is off the trip pawl table, where it normally lies, it is in direct contacting position with the corresponding adding wheel ratchet.

The casting 25 has milled slots to accommodate the cams 70. As the shaft 26 is rotated, the cams 70 operate, one at a time, against the outer ends of the transfer levers 62, driving them forward into the teeth of the adding wheel ratchets.

In case none of the trip pawls have been tripped, and all the transfer levers are in normal position when the operating handle is turned, there will be no transfer of amounts from one wheel to the other, but if one or more of the trip pawls have been tripped and the transfer levers are not in normal position when the operating handle is turned, the transfer levers being forced forward by the operating cams 70, will drive the transfer levers into direct contact with the adding wheel ratchets and transfer the amounts from one wheel to the other. After the transfer levers have been driven forward by the operating cams 70, they always return to normal position, through the influence of compression springs 71.

Just below where the operating cams 70 strike the transfer levers, they are designed to accommodate the ends of the compression springs. The other ends of these springs rest in holes drilled in the casting 25.

Each transfer lever 62 moves back and forth idly as the operating handle is turned unless its trip pawl has been tripped and allowed the lug of the transfer lever to drop off the table 67 in front of the shoulder 73. The transfer lever then is forced forward by the operating cam 70, and the transfer lever engages in the adding wheel ratchet 65 to move it forward or around one-tenth of a revolution, thus completing a transfer and restoring the transfer or lever into normal position.

For the purpose of keeping the adding wheels in alignment, there is supplied retaining pawls 74, which are swung on a shaft 75, which extends through the casting 25.

The inner ends of these pawls are made tooth shaped to fit into the adding wheel gears and are held in position by springs 76, which operate against the outer ends of the pawl 74, one on each side, and the other ends of the springs rest in holes drilled at proper angle in the casting 25.

These compression springs permit the retaining pawls to turn on the shaft as the adding wheels are rotating, and when the adding wheels stop, they adjust themselves to mesh properly in the adding wheel gears and align them.

The trip pawl cams are designed for operation when the adding wheels are set to zero, one side of the pawl being slightly beveled to come in contact with the trip pawl and stop the wheel when it is reversed to zero.

All adding keys are set to zero by the cashier when the customer returns the key after he has finished purchasing and placed in a convenient position so they can be handed to new customers.

There will be furnished with each mechanical adding key store, a sufficient number of the adding keys to supply each customer with a key. Each key in the store represents a clerk and with, say two hundred and fifty keys the customers may wait on themselves, get the merchandise they want and pay for what they get when they have finished purchasing.

When a customer enters a mechanical adding key store, he is given a key which entitles him to go where he pleases on the main floor and purchase what he wants in the following manner:

He passes through a turnstile and selects the first article he wishes to purchase. He then inserts the adding key into the opening 23. This unlocks the shelving. He then turns the handle one complete revolution until the key stops and the article is automatically moved forward by this turn. He takes the article from the shelf and releases the adding key and selects the next item he wishes, and so on until he has what he wants. He then passes to the cashier and pays the total amount that is added on the key and departs.

The cashier takes the key, makes the proper record of the money received, and turns the adding key to zero and places it in a rack to be handed to another customer who wishes to make a purchase, and so on.

What we claim is:—

1. A device of the character described including a movable merchandise container adapted to contain separate articles of merchandise, an independent manually operated device adapted to actuate said container, and including a price recording mechanism, said device also embodying means which operate the recording mechanism.

2. A device of the character described including a movable merchandise delivering container adapted to contain separate articles of merchandise, an independent manually operated device adapted to actuate said container to effect the successive delivery of said articles singly and including a price recording mechanism, said device also embodying means which operate the recording mechanism.

3. A device of the character described including a movable merchandise container, a mechanism for moving the same to effect successive deliveries of said merchandise, an independent manually-operated device provided to actuate said mechanism and including a price recording machine which is adapted to be operated by said mechanism to record the price of the merchandise, as delivered.

4. A device of the character described including a movable merchandise container, a mechanism for moving the same to effect successive deliveries of said merchandise, an independent manually-operated device including a price recording machine which is adapted to be operated by said mechanism to record the price of the merchandise, as delivered, means normally locking said mechanism against movement, means normally locking said recording machine against movement, and a release key carried by each locking means, through which the respective locking means are released when said mechanism and recording machine are brought into co-operating relation.

5. The combination with a merchandise delivery apparatus of an independent manually operated device through which said apparatus may be actuated to effect delivery of the articles of merchandise carried by said apparatus, said device including a price recording mechanism adapted to be operatively connected with, and actuated by said apparatus to record the price of the articles as delivered, and means for locking said apparatus and said manually operated device against operation when they are out of co-operative relation.

6. The combination with a merchandise delivery apparatus, of an independent manually operated device through which said apparatus may be actuated to effect delivery of the articles of merchandise carried by said apparatus, said device including a price recording mechanism arranged to be actuated by said apparatus, when in operative connection therewith, to record the price of the articles delivered thereby, and means automatically locking said apparatus against movement when in inoperative relation with said device.

7. The combination with a merchandise delivery apparatus of an independent manually operated device through which said apparatus may be actuated to effect delivery of the articles of merchandise carried by said apparatus, said device including a price recording mechanism arranged to record the price of the articles delivered thereby, separate locking means normally locking said apparatus and said device and a release key carried by each locking means, said keys operating to release said means when said apparatus and said actuating device are in co-operating position.

8. The combination with a merchandise delivery apparatus, of an independent manually operated device through which said apparatus may be actuated, said device including a price recording mechanism provided to record the price of the articles of merchandise delivered, and means for locking said device against operation when in inoperative relation with said apparatus.

9. The combination with a merchandise delivery apparatus, of a manually operated device through which said apparatus may be actuated, said device being detachable from said apparatus and including an actuating shaft, a recording mechanism provided to record the price of the articles of merchandise delivered, and a means driven by said shaft and actuating said apparatus and also driving said recording mechanism.

10. The combination with a merchandise delivery apparatus, of a manually operated device through which said apparatus may be actuated, said device being detachable from said apparatus and including an actuating shaft, a recording mechanism provided to record the price of the articles of merchandise delivered, and a means driven by said shaft and driving said recording mechanism, and means normally locking said apparatus and shaft against movement.

11. A device of the character described including a movable merchandise container adapted to contain and enclose separate articles of merchandise and an actuating means adapted to actuate said container to render said articles accessible, successively, said means including a price recording mechanism, normally locked against operation.

12. A device of the character described including a movable merchandise container provided with separate compartments and an actuating means adapted to actuate said container to successively deliver the articles of merchandise in said compartments, and a price recording mechanism, and adapted to actuate said means and being in turn operated thereby.

13. A device of the character described including a movable merchandise container adapted to contain and enclose individual articles of merchandise, a mechanism for moving the same, and a price recording key adapted to actuate said mechanism and simultaneously be operated thereby to record the price of the article delivered.

14. A device of the character described including a movable merchandise container, a mechanism for operating said container, means normally locking said mechanism against movement, a mechanical key which includes a price recording mechanism, means for normally locking said key against operation and releasing means carried by said mechanism and key, respectively, and provided to release the corresponding locking means when the key is brought into operative connection with said mechanism.

In testimony whereof we have signed our names to this specification in the presence of two subscribing witnesses.

THOMAS K. DIXON.
JESSE C. COX.
ALEXANDER KLEIN.

Witnesses:
R. M. SMITH,
E. V. HARDWAY.